UNITED STATES PATENT OFFICE.

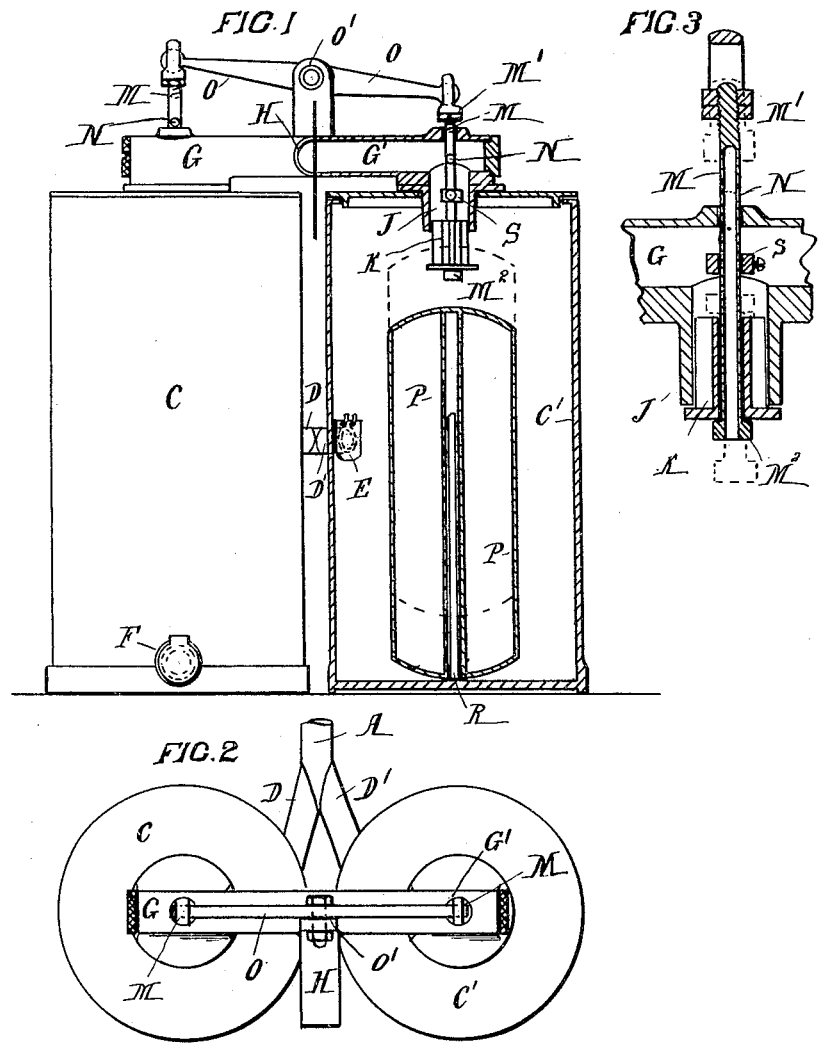

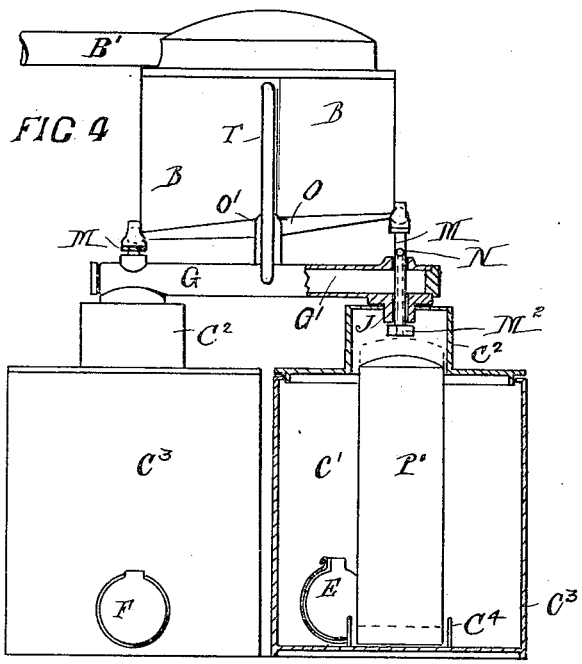
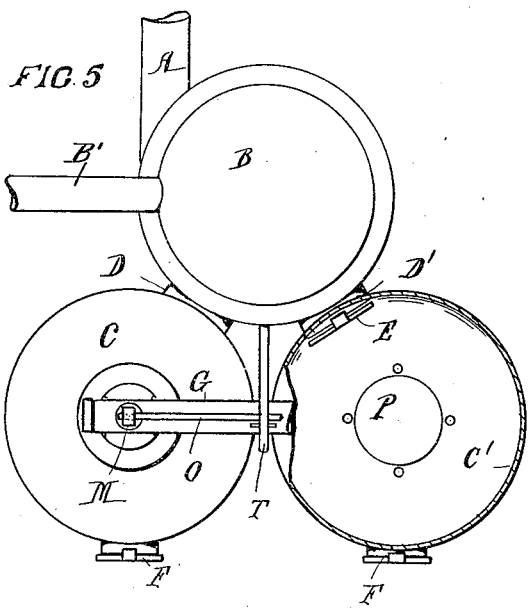

ALEXANDER WALKER REID, OF STRATFORD, NEW ZEALAND.

MILKING-MACHINE RELEASER.

1,119,536.  Specification of Letters Patent.  Patented Dec. 1, 1914.

Application filed April 22, 1914. Serial No. 833,679.

*To all whom it may concern:*

Be it known that I, ALEXANDER WALKER REID, subject of the King of Great Britain, residing at Stratford, in the Dominion of New Zealand, have invented new and useful Improvements in Milking-Machine Releasers; and I do hereby declare the following to be a full, clear, and exact description of the same.

This invention relates to that class of milking machine releaser for use in receiving the milk from the main milk flow vacuum pipe in which a pair of receiving cans are employed adapted to be alternately and reversely brought into connection with such pipe to receive the milk and with air to deliver the milk into a receptacle.

The invention also relates to that class of releaser in which the rising of a float in the can for the time being receiving the milk causes the connection between such can and the milk vacuum pipe to be broken and air admitted, and for the other can then to be connected with the milk vacuum pipe to in turn receive the milk.

The invention consists in an improved construction of mechanism whereby these changes in the connections of the two cans may be carried out in a simple and effective manner.

The invention is illustrated in the accompanying drawings, in which:—

Figure 1 is a half front elevation and half sectional elevation of one form of the releaser as constructed according to this invention. Fig. 2 is a plan thereof. Fig. 3 is a detail sectional elevation of the float controlled valve for governing the working of the releaser. Fig. 4 is a front elevation, partly in section, of an alternative construction of apparatus. Fig. 5 is a plan of the same, also partly in section.

The construction employed is adapted to work by direct connection with the milk flow pipe A as in the form shown in Figs. 1 to 3 or by connection with a receiver tank or chamber B into which the milk is first drawn from the milk flow pipe A, as shown in Figs. 4 and 5. In each construction two cans C and C' are employed which in the first construction are connected by inlet branches D and D' with the milk main A and in the second construction with the tank B through passages D and D'. The inlet of each passage into the respective cans is closed by means of a hinged gravity valve plate E which normally seals such opening but which is capable of swinging in with the weight of milk behind it in order to allow of such milk passing into the can. Thus when either can is connected with a source of vacuum, while the other is opened to atmospheric pressure, the milk will flow into the can for the time being connected with vacuum, in the one case passing direct from the milk pipe A, and in the other from the receiver B. Each can is also provided with a discharge valve F in its bottom that normally keeps closed by its own weight and remains closed by the pressure of the atmosphere while the can is under the influence of vacuum and receiving the milk, but which when the can is connected to atmosphere to break down the vacuum, will be swung open by the weight of the milk so as to allow the milk to flow out into a suitable receptacle placed beneath. In each construction provision is made whereby the cans may in turn be alternately connected with the source of vacuum and with air reversely to one another, such change from vacuum to air connection in each can being caused by the rising of a float contained in the can and lifted by the milk flowing into such can. The means devised for this purpose shown in Figs. 1 to 3 consist of pipe branches G—G' leading from a main H that is connected with the vacuum source, and into short cylinders J opening downward into the respective cans C—C'. The vacuum therefore acts through the two branches and through the respective cans, to draw the milk along the milk main A. Each cylinder J is provided with a valve K adapted to be raised and close its bottom end and to fall and open such end. Extending axially through the valve is a rod M the upper end of which extends out through the top of the vacuum connection G or G' and is furnished with a collar M' to limit its downward movement. The lower end of the rod projects through the bottom of the valve K and is formed with a head M² that is adapted to engage the valve. The rod is formed hollow from its bottom end upward and an aperture N is made in its wall near the upper end thereof and opening into the bore, as shown in Fig. 3. This aperture is so positioned that when the rod is raised to its upward limit, the aperture shall be situated above the branch G or G' in order that an air connection through it into the bore and